United States Patent [19]

Ragard

[11] 3,808,662

[45] May 7, 1974

[54] AUTOMATIC COMPONENT PROCESS SYSTEM

[75] Inventor: Phillip A. Ragard, Binghamton, N.Y.

[73] Assignee: Universal Instruments Corporation, Binghamton, England

[22] Filed: Mar. 5, 1973

[21] Appl. No.: 338,247

[52] U.S. Cl. ................................................ 29/203 B

[51] Int. Cl. ........................................... H05k 13/04

[58] Field of Search...... 29/203 B, 203 D, 203 MW, 29/203 R, 203 T, 203 TS

[56] References Cited

UNITED STATES PATENTS

| | | | |
|---|---|---|---|
| 3,442,430 | 5/1969 | Ackerman et al. | 29/203 B |
| 3,545,064 | 12/1970 | Zemek et al. | 29/203 D |
| 3,592,375 | 7/1971 | Zemek et al. | 29/203 B |
| 3,593,404 | 7/1971 | Ragard | 29/203 B |
| 3,641,651 | 2/1972 | Rockwell, Jr. | 29/203 B |

*Primary Examiner*—Thomas H. Eager
*Attorney, Agent, or Firm*—Fidelman, Wolffe, Leitner & Hiney

[57] ABSTRACT

An electrical component process line for circuit boards having a single control module and a single load and drive module with an unlimited number of attachable component processing and transfer modules, each including a plurality of processing stations therein. Each module is interconnected without modification by a pair of rails upon which the circuit board travels and a transport arm drive shaft.

15 Claims, 13 Drawing Figures

AUTOMATIC COMPONENT PROCESS SYSTEM

BACKGROUND OF THE INVENTION

1. Field of the Invention

The present invention relates generally to automated electrical component process lines and more specifically to a modular automatic electrical component process line where the additional processing modules are connected without modification to the system.

2. Description of the Prior Art

In the field of machines for assembling electronic circuit components on circuit boards, there has been a variety of multi-station units. These units usually involve a unitary structure having a chain-driven or other means for advancing circuit boards from station to station. The units cannot be extended without modification of the drive chain as well as interconnection of structural supports.

Similarly the insertion lines of the prior art have involved complicated mechanical linkage between the various operating elements to achieve cyclic and synchronized operations. The number of components used in the prior art to achieve these functions prevented the modular concept of addition of units to the process line without modification. The only way the process lines could be increased or decreased was by adding or subtracting stations to a fixed structure. The process lines presently in use cannot be enlarged by mere interconnections without major modification.

SUMMARY OF THE INVENTION

The present automatic component process system includes a master control module, a drive and load module, and a plurality of component processing and transfer modules. Circuit boards are loaded from a magazine in the drive and load module and transported across a pair of continuous rails by transport arms to the plurality of stations within a plurality of component processing and transfer modules. The individual transport modules have their own self-sustaining structure and are interconnected by a pair of rails as well as a transport drive shaft upon which the plurality of transport arms are mounted. The drive module produces lateral oscillatory motion of the drive shaft whereby the transport arms move a circuit board laterally from one station to the next and then the arms move back to their original station. To prevent the transport arm from colliding with the board behind it during the return trip, the arms are rotated down out of the horizontal plane of the circuit board by a unique C-shaped rotation drive arm until they are returned to their original position.

At each station, there are locking fingers which engage an indentation on the lateral edge of the circuit board and hold it fixed there during the processing at the individual stations. The rotary drive assembly which causes the transport arms to rotate into and out of a horizontal plane defined by the circuit board is also linked to a shaft which, through camming action, retracts the locking fingers and allows the board to be transported from one station to the other. Thus, by a single command from the master control module, the locking fingers engage or disengage the circuit board and the transport arm simultaneously enters or leaves the plane defined by the circuit board. A multitude of sensing devices are provided to indicate failure of the loading mechansim as well as the presence and precise location of the circuit boards at the individual stations. This information is used by the master control module to provide an indication to an operator as well as to shut down the line.

OBJECTS OF THE INVENTION

An object of the present invention is to provide an automated electronic component processing line wherein a module having a plurality of stations can be interconnected without modification.

Another object of the present invention is to provide a simplified transport system with a reduced number of parts, thereby increasing reliability.

A further object of the present invention is to provide synchronization of locking and transport means by the use of a single actuator and thus reduce the number of mechanical linkage or elements.

Still another object is to provide a module processing line wherein the lines need only be interconnected at the pair of transport rails and the transport arm drive shaft.

Other objects, advantages and novel features of the present invention will become apparent from the following detailed description of the invention when considered in conjunction with the accompanying drawings.

DESCRIPTION OF PREFERRED EMBODIMENTS

Figure 1:
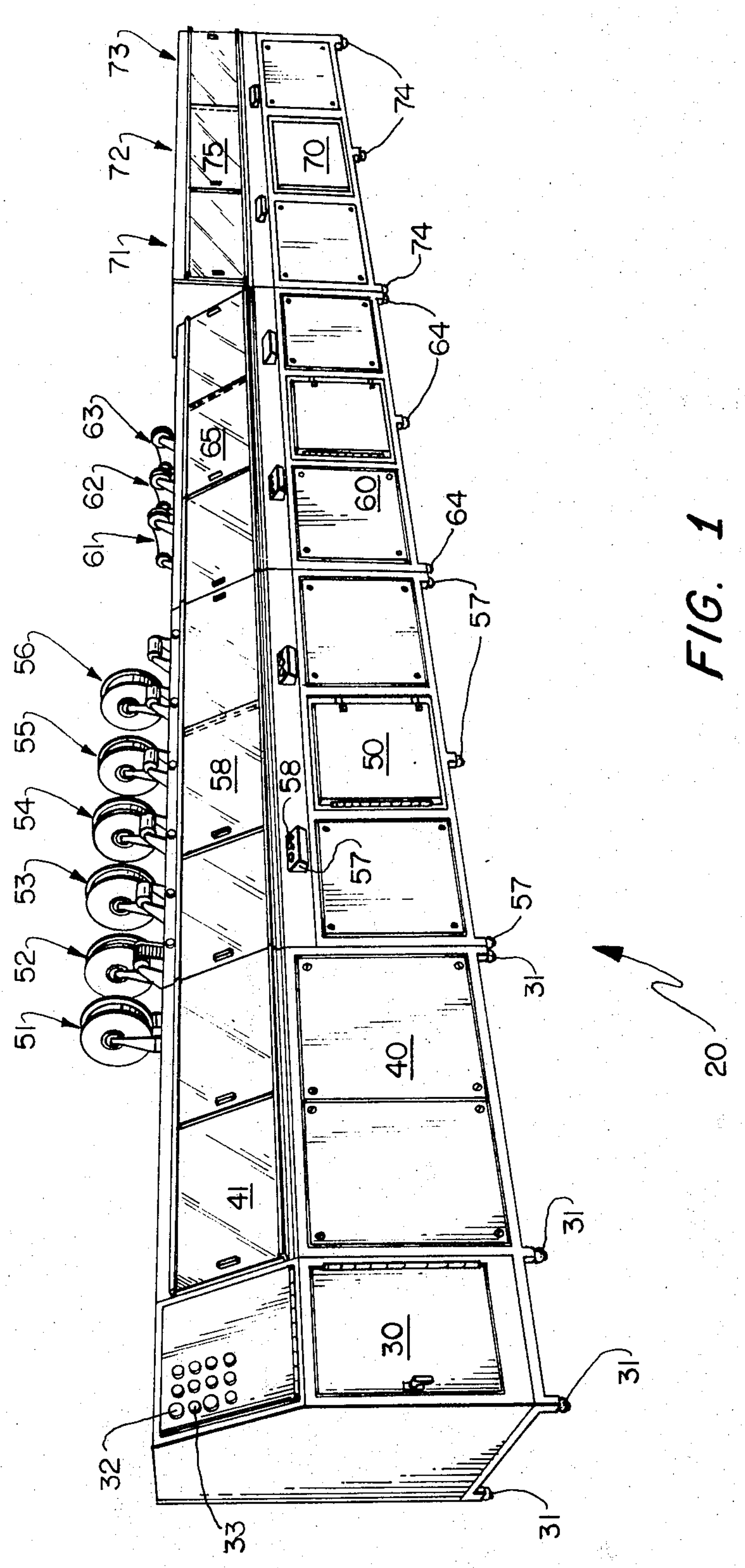
FIG. 1 is a diagrammatic view showing the automated component process system of the present invention.

Referring now to FIG. 1, there is shown the automated component process system designated as 20 having a master control module 30, a drive and load module 40, and a plurality of component processing and transfer modules 50, 60 and 70. For the process line shown, module 50 has six component insertion devices 51–56 which sever electrical components from tape carriers, deform the component and insert them in the circuit board. Examples of these insertion devices are shown in U.S. Pat. Nos. 3,593,086 and 3,593,404. Module 60 is shown having three wiring stations 61–63 which use devices well known in the art, and module 70 has three DIP inserters 71–73 which use devices shown in U.S. Pat. Nos. 3,442,430 and 3,545,064. Though the present process line is shown as having a specific number and type of modules and devices, they are but examples. The number of modules may be varied and the devices per module may also vary. An example of another insertion device which may be used is a transistor inserter as shown in U.S. Pat. No. 3,592,375. The individual module rests on adjustable feet 31, 57, 64 and 74, respectively, and have sliding glass doors 41, 58, 65 and 75, respectively, for inspection and manual processing.

Master control module 30 has indicators 32 and control buttons 33 and forms a single unit with drive and load module 40. Each of the component processing and transfer modules 50, 60 and 70 have a manual control unit exemplified by unit 57 with control buttons 58. An operator monitoring the automated process line may modify the process sequence manually at the master control module 30 or at the individual component modules. In each module, there is a duct 34 traversing the length thereof enclosing the communication links between the master control module 30 and the individual component processing and transfer modules.

The operation of the present process line commences under the control of master control module 30, with the loading of a single board 42 from magazine 43. The board is transferred to one operating station at a time along a continuous tract. Upon being sensed and locked at each station, a preprogrammed process will take place at that switch, be it component insertion or wire application. As the first board is moved from the first station to the second station, a second board is being moved from the load and drive module 40 to the first station.

DRIVE ASSEMBLY 100

Figure 2:
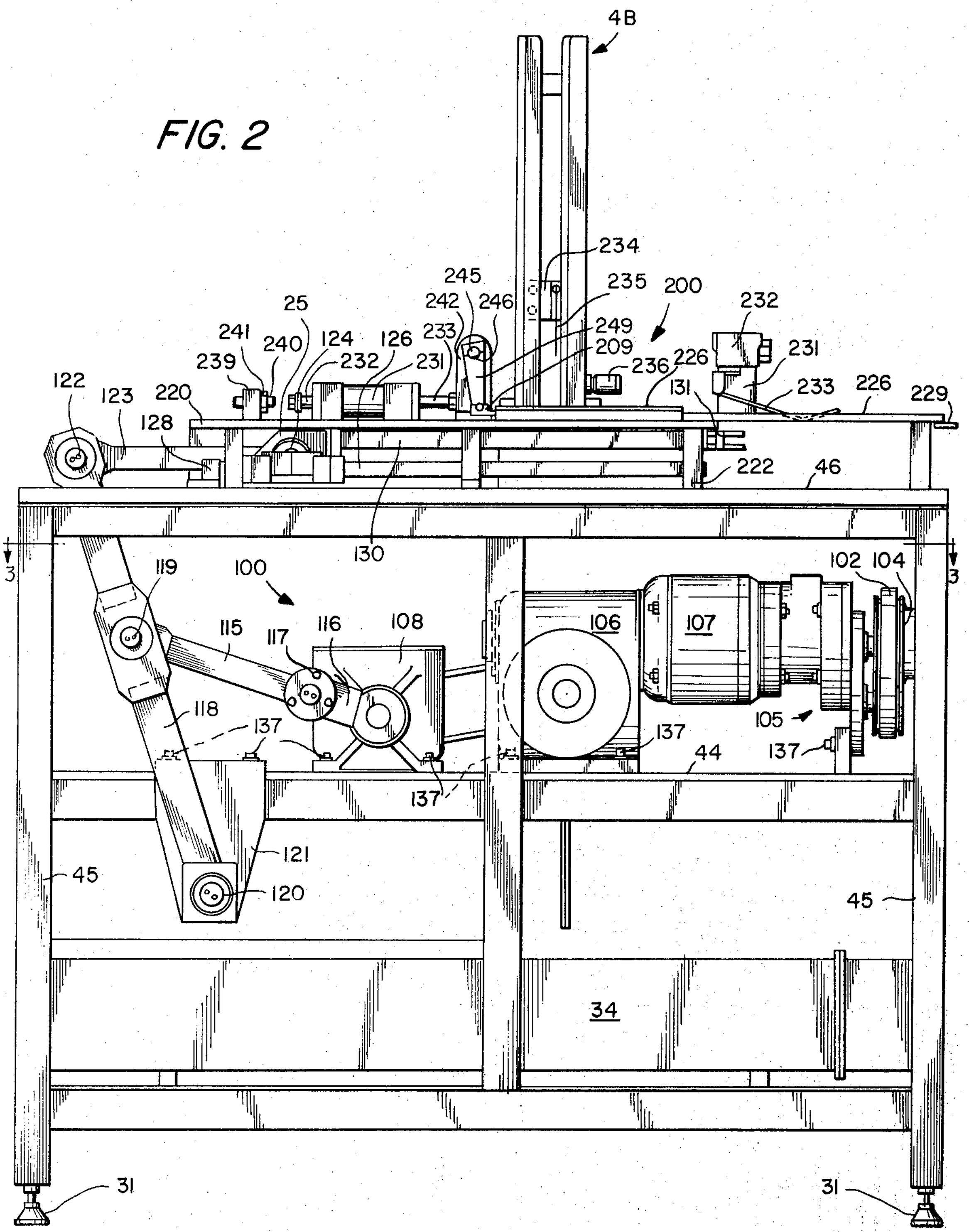
FIG. 2 is a front view of the drive and load module with the case removed.
Figure 3:
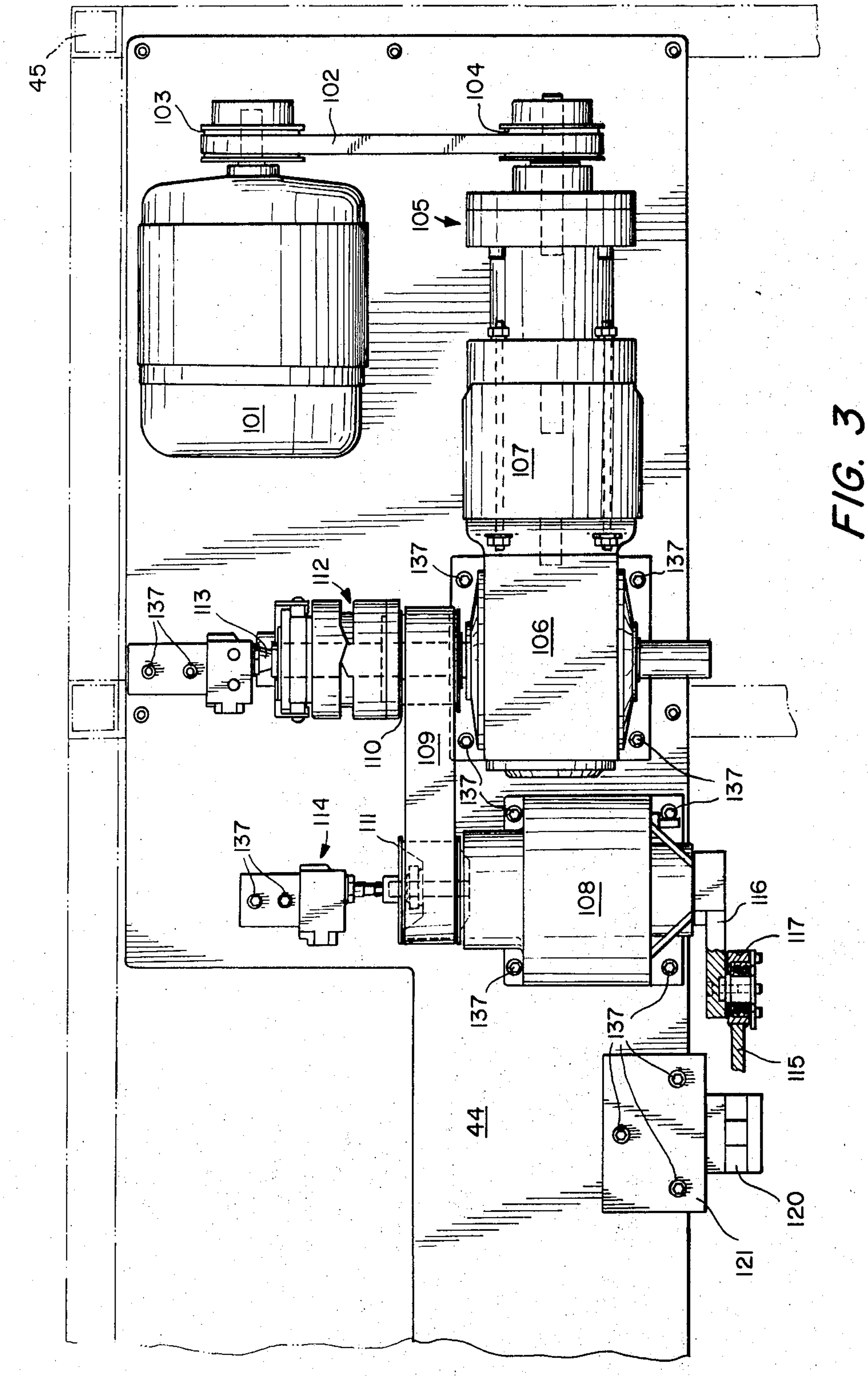
FIG. 3 is a top view of the drive assembly taken along line 3—3 of FIG. 2.
Figure 4:
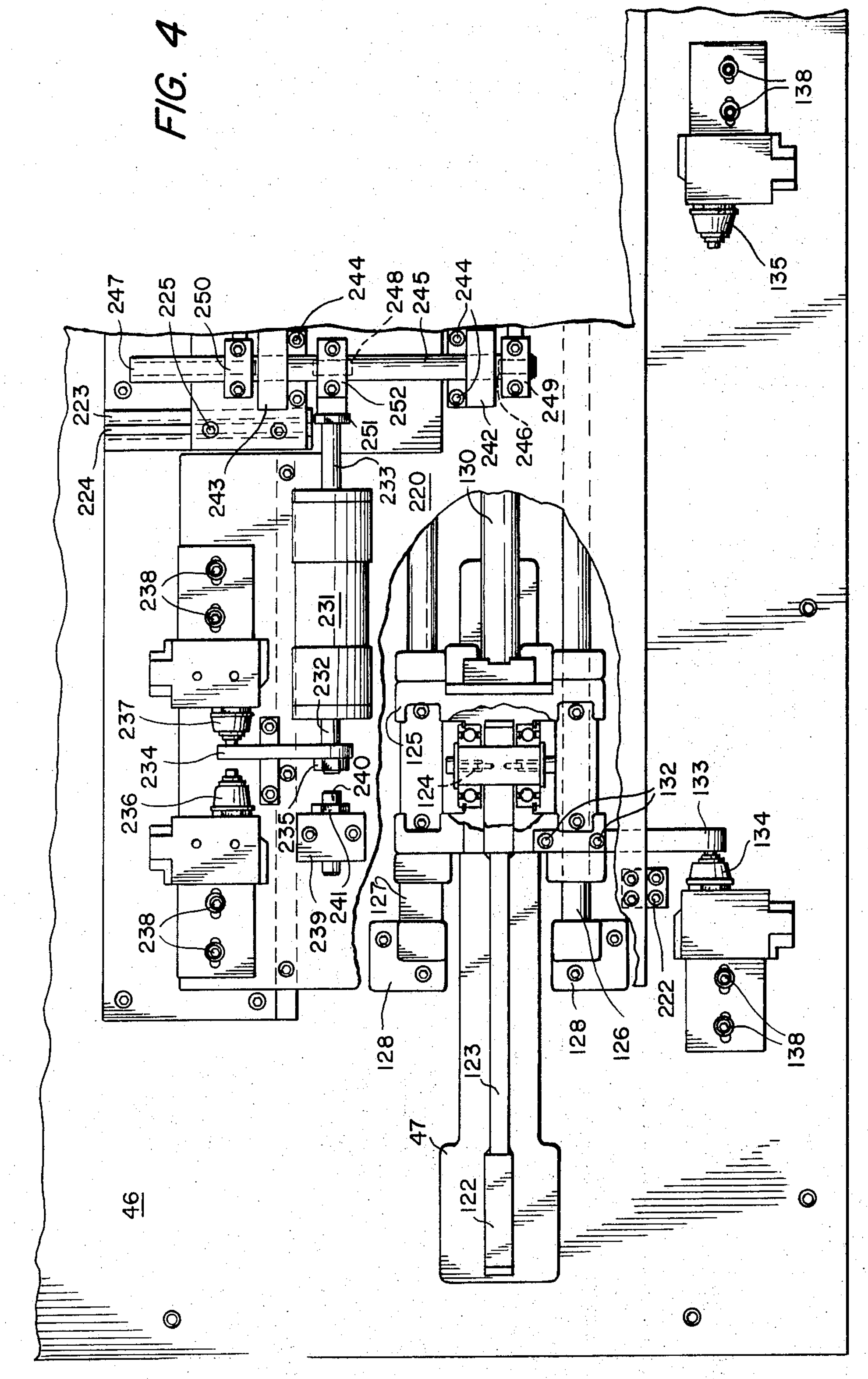
FIGS. 4 and 4a are a top view of the drive and load module showing some parts in section for the sake of clarity.
Figure 4A:
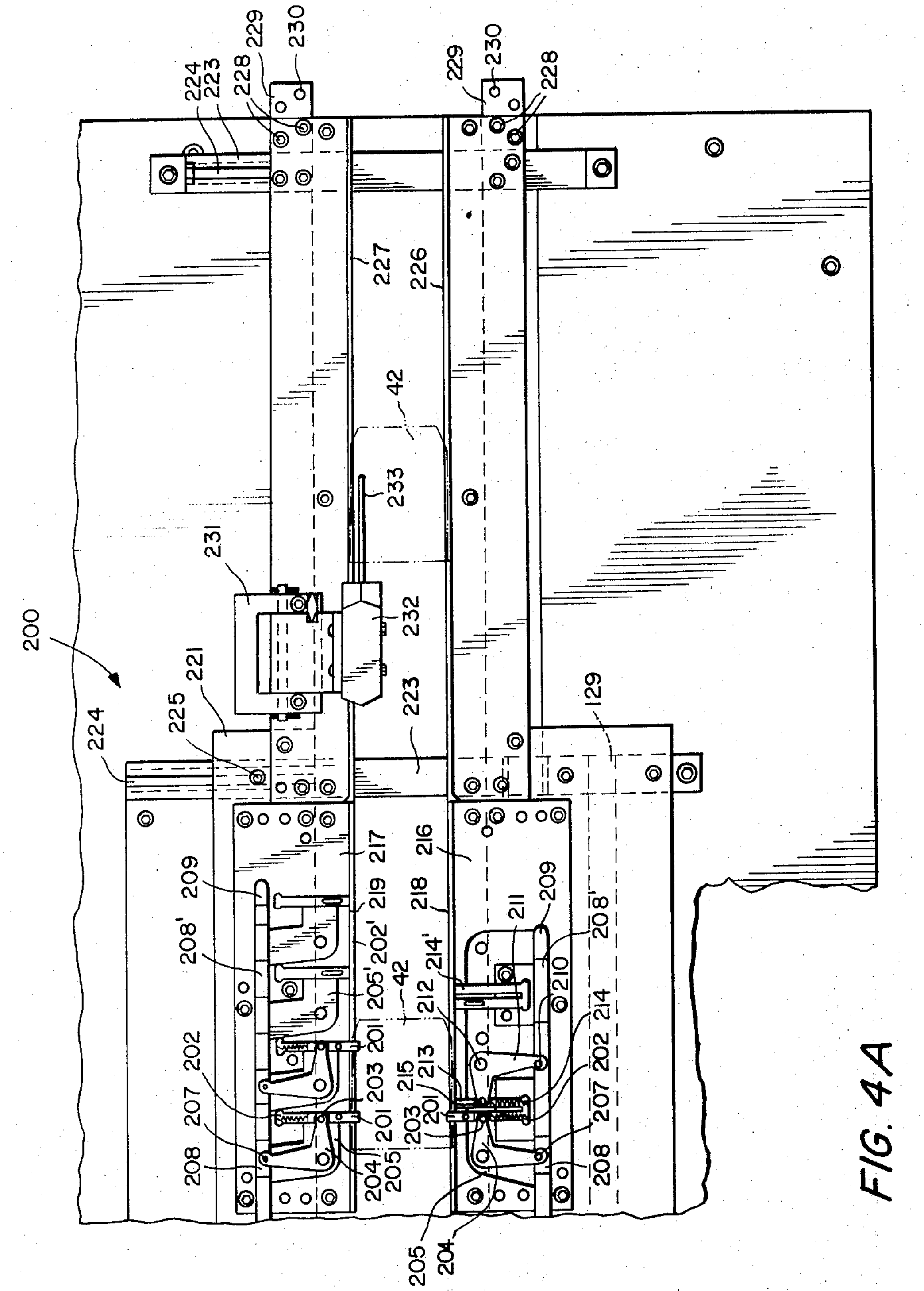

Referring now to FIGS. 2–4, there is disclosed the drive and load module 40 having a drive assembly 100 secured to a shelf 44 which is secured to legs 45 and a load assembly 200 secured to shelf 46 which is also secured to legs 45. Shelf 46 has a slot 47 therein (as shown in FIG. 4) to receive the linkage connecting the drive assembly to the loading assembly and the transfer modules in the process line.

The drive assembly 100 has a prime mover or drive motor 101 secured to shelf 44, as shown in FIG. 4. The output of drive motor 101 is coupled by belt 102 and pulleys 103 and 104 to an electric clutch 105. The mechanical power from electric clutch 105 is coupled to gear box 106 through a fail-safe mechanical break 107 which guarantees that there will be no energy transfer between the drive motor 101 and the remainder of the drive assembly when the system is turned off, either manually or due to a system failure. The gear box reduces the rpm received from the drive motor and transmits this reduced rotation speed to an intermittent drive unit 108 by belt 109 and pulleys 110 and 111. Connected to the output of gear box 116 is an overload clutch 112 which will kickout in an overload condition and prevent the output of the gear box from being transmitted to intermittent drive unit 108. Microswitch 113 detects the kicked out condition of overload clutch 112 and transmits this information to master control module 30. Engaging the input to intermittent drive unit 108 is a timing device 114 which senses the rotational velocity at the input and transmits the same to the master control module 30 to be used there as a clock or timing input.

As previously described, the circuit boards are moved to a station, are processed at that station, and are moved to the next station. The intermittent drive unit 108 and linkage (to be described hereinafter) transforms rotational drive motion into an oscillatory or reciprocal linear drive motion. The rotational output of intermittent drive unit 108 is transmitted to link 115 by link 116 through a coupling 117. The other end of link 115 is coupled to link 118 at a coupling 119. The lower end of link 118 is pivotally secured at 120 to a plate 121 which is secured to shelf 44 and extends downward therefrom. The upper end of link 118 is coupled at 122 to a horizontal link 123. The other end of horizontal link 123 is coupled at 124 to a shuttle 125 which runs along tracks 126 and 127, which are secured at one end to blocks 128 and at the other end to a horizontal support 129. Horizontal drive arm 130 has one end rotatably secured to shuttle 125 and a "mateable" coupling 131 at its other end. The transfer modules are coupled to the drive assembly at "mateable" coupling 131.

Secured to the top of shuttle 125 at 132 and extending laterally therefrom is an actuator 133. Microswitches 134 and 135 detect the position of shuttle 125 at the two extremities of its travel when actuator 133 comes in contact therewith. The signals from microswitches 134 and 135 are transmitted to master control module 30.

The operation of the drive assembly begins with the initiation of the intermittent drive unit 108 in response to a signal from the master control module 30 to couple the continuous input to the output for one revolution. This would be accomplished by a single revolution clutch, for example. Link 116 begins to rotte from the position shown in FIG. 2, causing link 115 to pivot and move to the right. The movement of link 115 causes a clockwise rotation of link 118 rotate its lower end pivotally secured at 120. The rotation of link 118 produces a lateral movement of horizontal link 123, shuttle 125 and horizontal drive arm 130. Actuator 133 moves out of engagement with microswitch 134. After 180° of rotation of link 116, actuator 133 engages microswitch 135 and shuttle 125 and horizontal drive arm 130 reverses their lateral motion. The distance of travel of shuttle 125 between microswitches 135 and 135 may be adjusted by replacing links 115 and 123 and moving microswitch 135.

Standard fasteners 137, such as nuts and bolts, are used to secure drive motor 101, electric clutch 105, gear box 106, intermittent drive unit 108, sensor 113, timing device 114 and plate 121 to shelf 44 and fasteners 138 to secure microswitch 134 and 135 to shelf 46. Transport arms, which are connected to drive arm 130 and move the board 42 in drive and load module 40, are not shown for the sake of clarity.

LOAD ASSEMBLY 200

Referring primarily to FIG. 4 and secondarily to FIG. 2, the drive assembly is disclosed for delivering one board 42 at a time from magazine 43 to a rail system for transport to the processing modules. The stack of circuit boards rest on three fingers 201 which slide in recesses 202 and are pinned at 203 to a generally L-shaped rocker arm 204 which lies in recesses 205. The rocker arms 204 pivot around pins 206 and have their other ends pinned at 207 in recesses 208 to actuation arm 209. Also pinned to actuation arm 209 at 210 is rocker arm 211 which pivots around pin 212. A clamp 213 which engages the lateral edge of the second board in the stack during the feeding operation slides in recess 214 and is pinned at 215 to the other end of rocker arm 211. Additional recess 202', 205', 208', and 214' are shown for the inclusion of additional fingers, rocker arms and clamps for longer circuit boards.

The aforementioned fingers, rocker arms and clamp are secured in escapement housing 216 and 217, which are shown in FIG. 4 with their cover plate removed. Escapement housing 216 having rail 218 is mounted to fix shelf 220 and escapement housing 217 having a rail 219 is mounted to adjustable shelf 221. The shelves 220 and 221 rest on vertical support 222 and horizontal supports 223. Slots 224 are provided in horizontal supports 223 to receive fasteners 225 which adjustably mount shelf 221 to the horizontal supports 223. The distance between rails 216 and 217 may be enlarged to accommodate wider circuit boards by the adjustment of shelf 221. Also mounted to shelves 220 and 221 at one end are extension rails 226 and 222. The other end of rails 226 and 227 are mounted to a horizontal support 223 securely and adjustably, respectively. Secured to one end of rails 226 and 227 at 228 are coupling plates 229 with apertures 230. The rails of the processing modules are coupled to the drive and load module by attachment to coupling plate 229 using fasteners through apertures 230.

Secured to extension rails 227 is a support 231 which has a counter 232 mounted thereon. The counter 232 has a feeler arm 233 which lies in the path of the circuit boards being transported from the drive and load module 40 to the processing modules. As a board moves past the counter, feeler arm 233 moves vertically and registers a single count in the counter.

Referring specifically to FIG. 2, the magazine 43 has a supply exhaust detector 234 mounted thereon to signal when the level of boards in the magazine reaches a preselected low level. The detector 234 may be self-contained and provide a visual or audible alarm, or may transmit the detected low level to the master control module for display and control. A feeler 235 is shown which engages the boards in the magazine above a preselected level.

Also secured to magazine 43 is another clamping device 236 which engages the lateral edge of at least one board to clamp it into position during feeding operations to be described later. The clamping device 236 supports a majority of the stock and relieves a majority of the load on clamp 213. Clamping device 236 is directly controlled by the master control module 30.

The loading assembly is controlled by a pneumatic double-acting piston 231 with piston rods 232 and 233. On the end of piston rod 232 is mounted actuator 234, retained by bolt 235, for engaging either of two microswitches 236 and 237, which are mounted to shelf 220 by fastener 238. The microswitches 236 and 237 and piston 231 communicate with master control module 30. A block 239, mounted to shelf 220 has a resilient stop 240 secured thereto by nut 241.

Two stationary supports 242 and 243 are secured to shelves 220 and 221, respectively, by fasteners 244 and each has a bore therein to receive a circular shaft 245 which has flattened surfaces 246, 247 and 248 at both ends thereof and at the center, respectively. Mounted on shaft 245 and engaging surfaces 246 and 247 are links 249 and 250, respectively, which have actuation arms 209 mounted on their other end. Secured to piston rod 233 with lock nut 251 is link 152 having its other end mounted on shaft 245 and engaging surface 248. It should be noted that surface 247 is substantially longer than the other two surfaces so as to allow for the adjustment of rail 219.

The operation of the load assembly 200 begins with the elements in the position shown in FIGS. 2 and 4 with actuator 234 engaging microswitch 237, fingers 201 extended, and clamps 213 and 236 retracted. The fingers 201 engage the lower surface of the first circuit board in the magazine and thereby support the weight of the total supply. As pneumatic piston 231 is activated, piston rod 232 moves left until it engages stop 240 and actuator 234 engages microswitch 236. Simultaneously, piston rod 233 moves right causing shaft 245 to rotate which drives actuator arms 209 laterally to the right. Fingers 201 are retracted by the lateral movement of actuator arms 209 allowing the first circuit board to drop onto rails 218 and 219. The lateral movement of actuator arm 209 also causes clamp 213 to engage the lateral edge of the second circuit board and clamp it against the magazine walls. At this moment, the supply is supported by the second circuit board clamped by 213 and the boards clamped by now activated clamp 236.

Upon the dispensing of a single circuit board, piston 231 is reversed causing actuator 234 to engage microswitch 237, fingers 201 being extended to support the circuit board supply and retract clamps 213 and 236.

TRANSPORT ARM ASSEMBLY 300

Referring to FIGS. 5–9, a typical transfer module is disclosed having transport arm assembly 300 and board sensing and locking assembly 400. The transfer module has vertical legs 301 which support horizontal shelves 302 and 303. A duct 34 which houses the communication link between the master control module 30 and the individual transfer modules is secured between shelves 302 and 303. Secured to the rear legs 301 is a duct 304 with manual shut-off valves 305 which connect the master control module 30 to the individual insertion heads 51–56, for example, one of which is shown in phantom in FIG. 6.

Secured to the transfer module frame above shelf 303 is a platform 306 which traverses the length of the module. Mounted to platform 306 at one end and shelf 303 at another end by bolt and clamp 307 are a plurality of platforms 308, one for each station in the module. Platforms 308 support the insertion heads 51 and receives in slots 310 a pair of protrusions 309 extending from the bottom of the insertion heads at the front and rear. At the front and rear center of insertion heads 51 are horizontal pins 311. Brackets 312 are adjustably secured in slot 310 of platform 308 and overlays bars 311 so as to secure the insertion heads 51–56 to the platform 308. The position of the insertion heads must be adjustable to accommodate the change in rail width made for various size circuit boards.

Connected to the end of rails 218 and 219 of the drive and load modules 40 by coupling plates 229 are rails 313 and 314, respectively. Mounted below rail 313 is a strip of shock absorbing material 315 which prevents damage to the transport arms from any accidental contact with rail 313, as will be described later. The rail 313 is attached by welding, for example, to a plate 316 which is secured to three supports 317 by fasteners 318. The other rail 317 is similarly attached to a plate 319 which is secured to three blocks 320 which adjustably mount the rail 314 to the other side of support 317 in slotted guides 321. The rail 314 is shown adjusted for the largest width current board.

Figure 5:
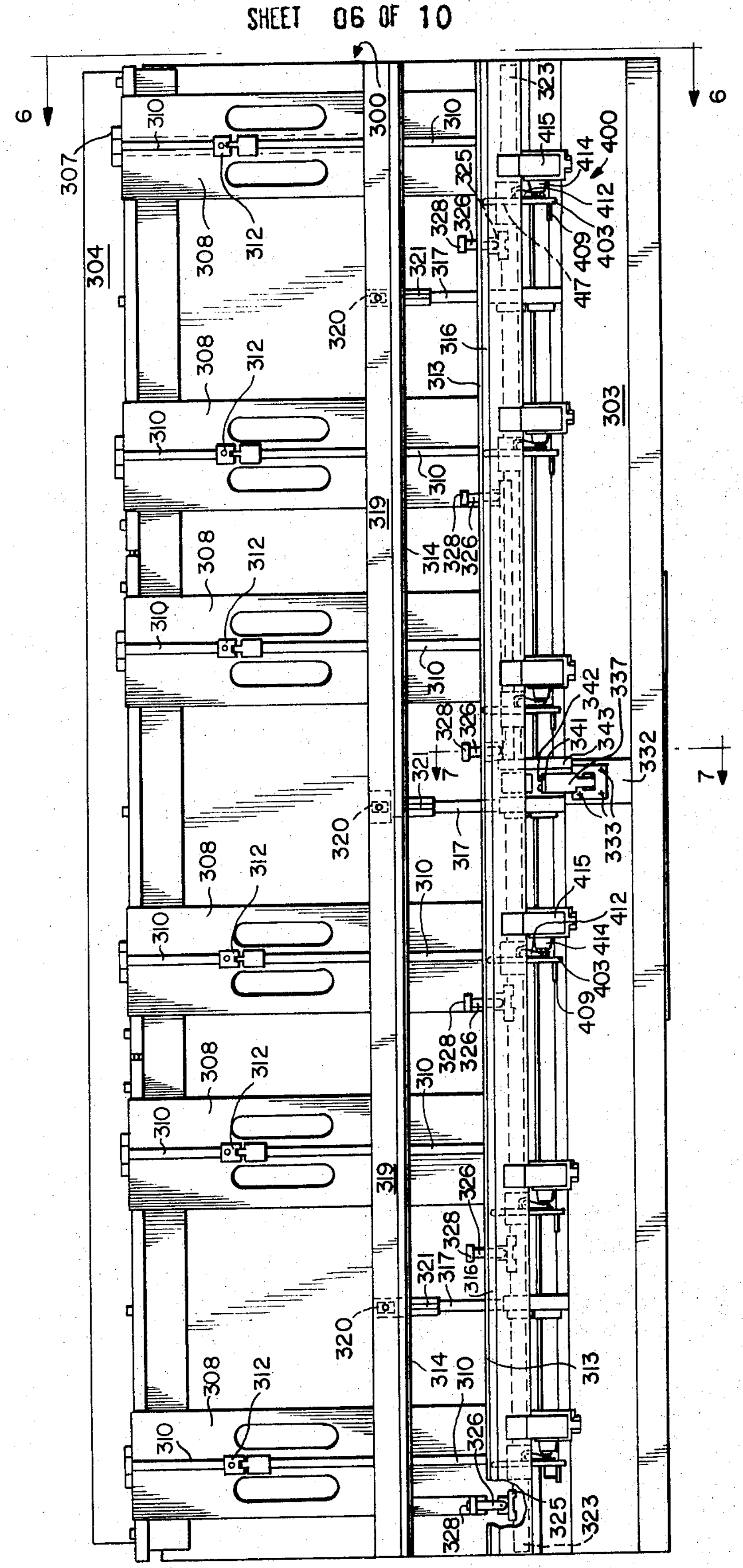
FIG. 5 is a top view of a six-station transfer module.
Figure 6:
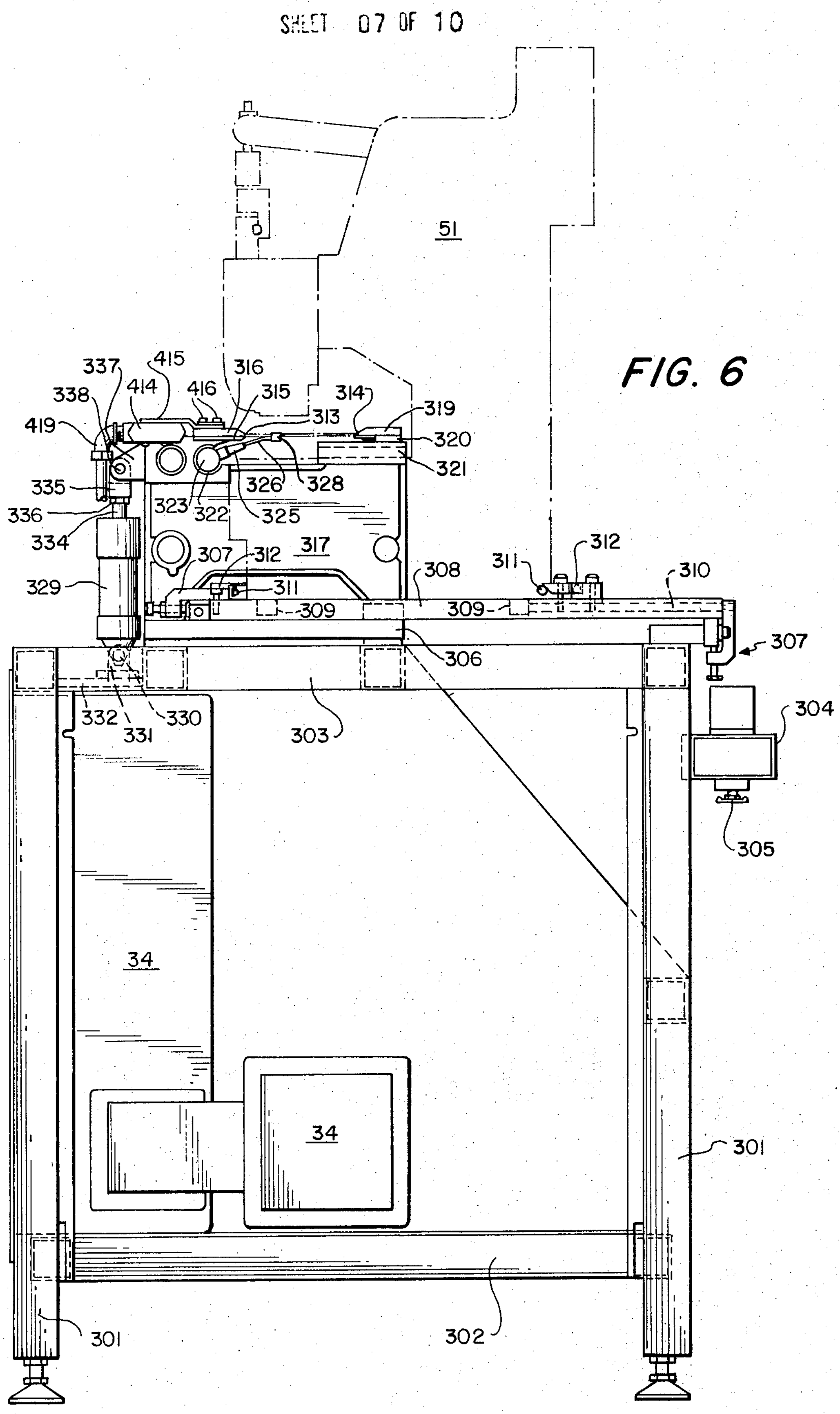
FIG. 6 is a right side of a transfer module with an insertion device shown in phantom.

Received within C-shaped bore 322 of supports 317 is transport arm drive shaft 323 which is coupled to horizontal drive arm 130 of the drive and load module 30. Secured to transport arm drive shaft 323 by fastener 324 are a plurality of blocks 325 which the individual transport arms 326 are secured by fastener 327. There may be a plurality of apertures in transport arm drive shaft 323 so the transport arms 326 may be adjusted. As shown in FIG. 5, there are six transport arms, one for each station and the block 325 for the fourth transport arm extends to and becomes the block for the fifth transport arm. This is significant to perform the required rotation of transport arm drive shaft 323 as will be described. Mounted to the end of each transport arm 326 by fastener 327 is a pad of shock absorbing material 328 to prevent damage to the circuit board when the transport arm comes in contact therewith.

Figure 7:
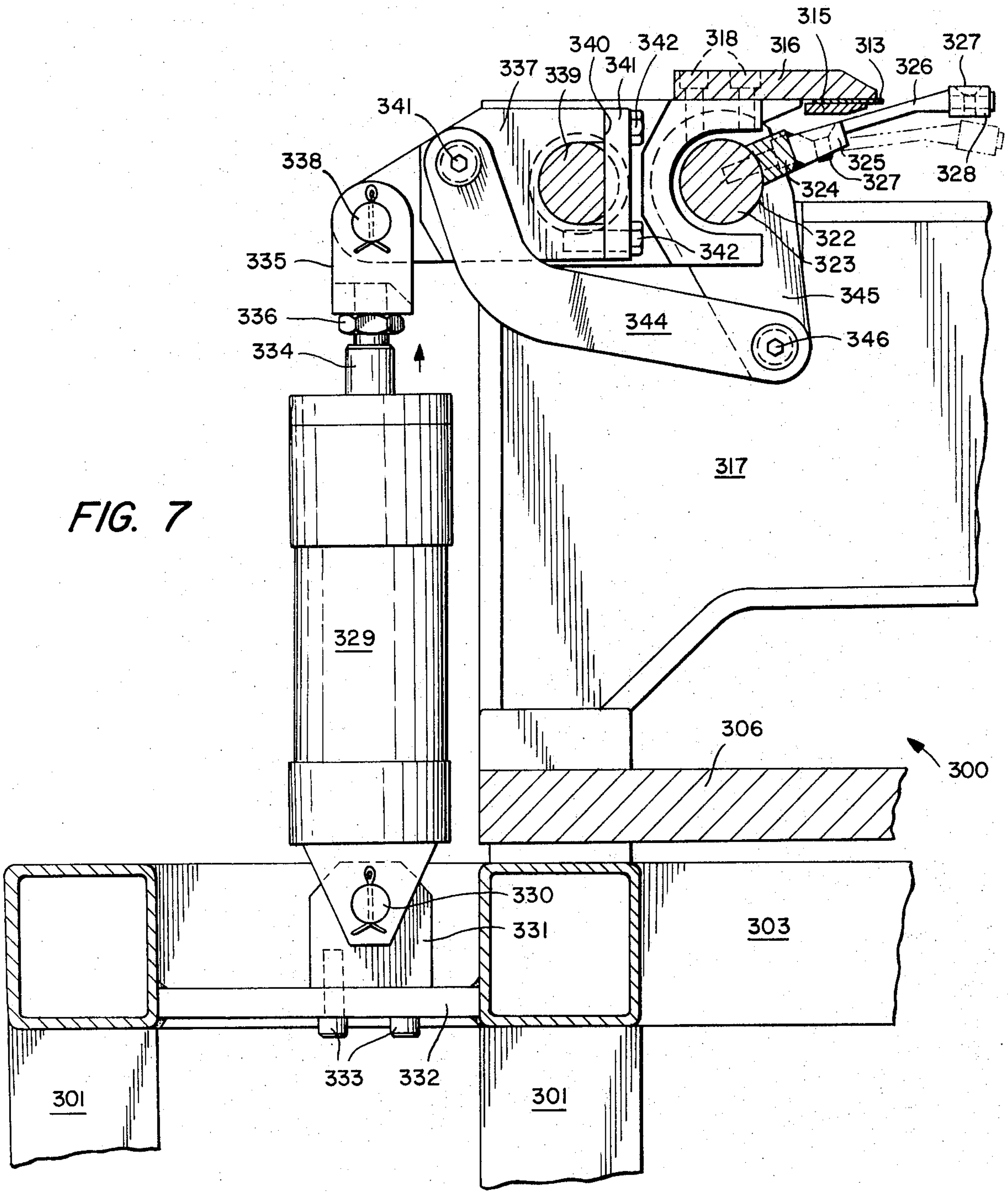
FIG. 7 is an enlarged view of the transport arm assembly taken along line 7—7 of FIG. 5.

Referring to FIG. 7, a subassembly is shown which will cause the transport arm drive shaft 323 to rotate having a pneumatic piston 329 under the command of the master control module 30. One end of the piston 329 is secured by pin 330 to a mount 331 which is secured to a flange 332 by fasteners 333. Extending from the other end of piston 329 is a piston rod 334 which has a coupling 335 threaded thereon and secured by lock nut 336. Coupling 335 is attached to arm 337 by pin 338. The other end of arm 337 is mounted on lock return shaft 339 at a flat recess 340 by plate 341 and fasteners 342. Lateral movement of the piston rod 334 causes rotational movement of lock return shaft 339.

Mounted at one end to arm 337 by pin 343 is link 344 whose other end is coupled to link 345 by pin 346. The other end of link 345 has a C-shaped aperture 347 which receives transport arm drive shaft 323 in the center thereof with block 325 extending through the open section of the C.

The operation of the transport arm assembly 300 begins upon completion of an insertion cycle, with the master control module 30 controlling piston 329 to lower piston rod 344 which through links 344 and 345 key on block 325 to rotate transport arm drive shaft 323 counter-clockwise to move transport arms 326 from the phantom position, which is below the horizontal plane of the circuit board, to the solid position as shown in FIG. 7. Once the transport arms 326 are raised, drive assembly 100 causes transport arm drive shaft 323 to move the transport arms 326 to the right in FIG. 5, thereby engaging the rear lateral edge of individual circuit boards at their respective stations and move them to the next station. Once they have reached the next station, the piston 329 raises piston rod 334 which through rotation of transport arm drive shaft 323, moves the transport arm 326 from the solid to the phantom position out of engagement with and below the horizontal plane of the circuit board. The drive assembly 100 then moves transport arm drive shaft 323 and the transport arm 326 to the left and back to their original positions.

It is evident from the operation description of the transport arm drive assembly that the C-shaped aperture 346 must be large enough to allow the transport arm drive shaft 323 and block 325 to slide therethrough, yet not so large as to reduce the mechanical bit required to rotate shaft 323.

BOARD SENSING AND LOCKING ASSEMBLY 400

Figure 8:
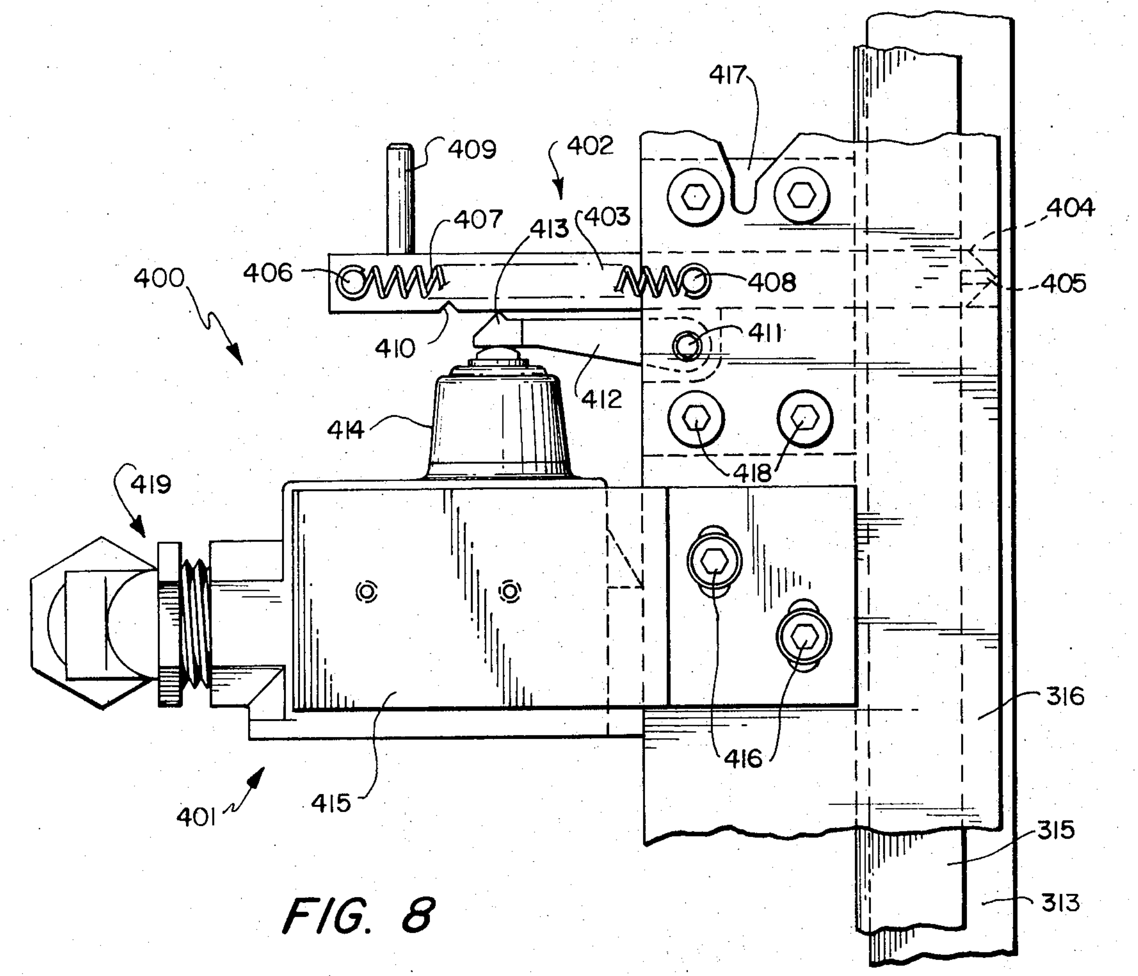
FIG. 8 is an enlarged top view of the board sensing and locking assembly.
Figure 9:
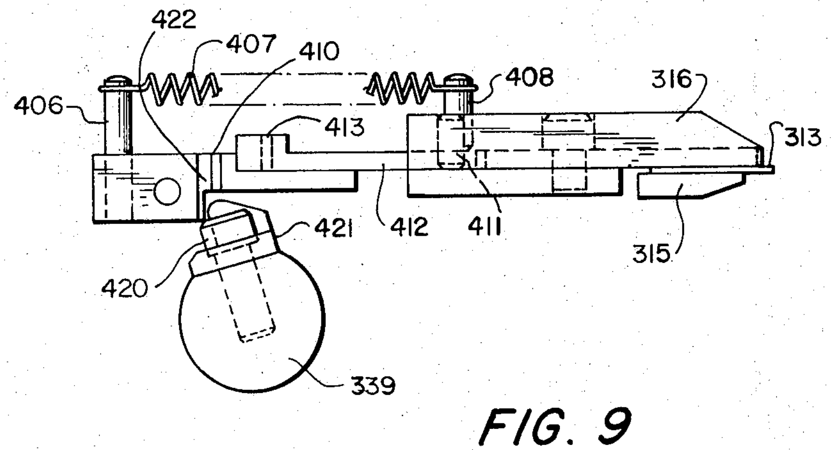
FIG. 9 is an enlarged side view of the board sensing and locking assembly.

Referring now to FIGS. 8 and 9, the board sensing and locking assembly 400 is depicted having an indexing subassembly 401 and a microswitch subassembly 402. The indexing subassembly 401 has an indexing finger 403 with a pointed end 404 having an elastic tip 405 therein. The index finger 403 lies in a recess in plate 316 and on rail 313 and a plate 417 secured to plate 316 by fasteners 418. The other end of indexing finger 403 has a vertical post 406 to which is attached a spring 407 whose other end is attached to post 408 which is mounted to plate 316. Spring 407, being a biasing spring, biases indexing finger 403 so as to extend past rail 313. Extending from one side of indexing finger 403 is a horizontal post 409, which allows manual operation of the indexing finger, and on the other side is a notch 410.

Pivotally secured in a recess of plate 316 by pin 411 is an arm 412 having a protrusion 413 near its other end which engages the lateral edge of indexing finger 403. The lateral edge of arm 412 opposite protrusion 413 engages a three position microswitch 414 which is attached by mounting 415 and fastener 416 to plate 316. For the embodiment shown, the microswitch is pneumatic and communicates with master control module 30 by hose and coupling 419. Mounted by a fastener 420 in a recess in lock return shaft 339 is a cam element 421, which engages a lower portion 422 of indexing finger 403.

Figures 10A, 10B, 10C:
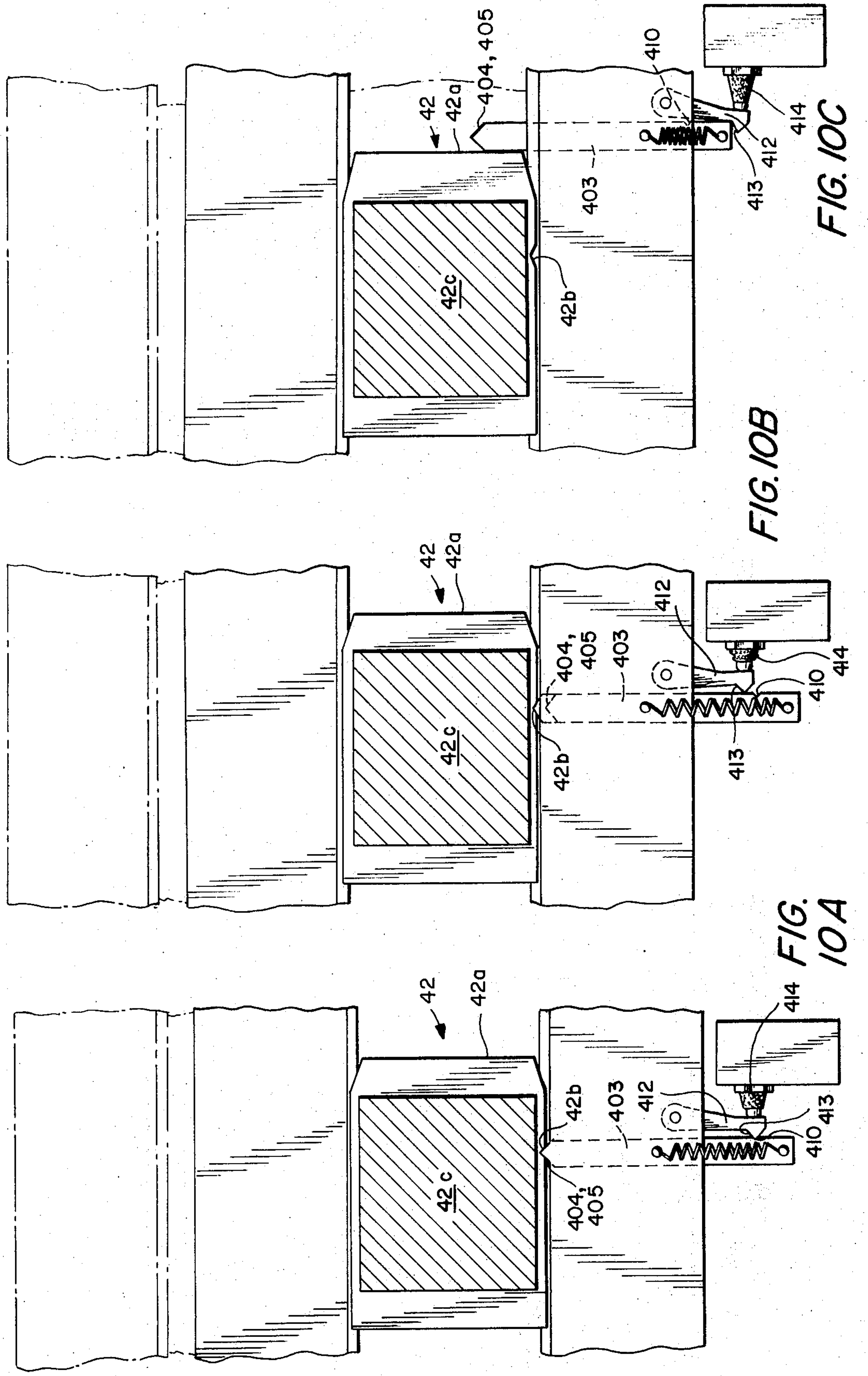
FIGS. 10*a*, *b* and *c* are top view of the interrelationship of the board and the board sensing and locking assembly.

The operation of the board sensing and locking assembly 400 will be described with reference to FIGS. 7–10. The board 42 is shown as including a transport plate **42*a* with an indexing-locking notch 42*b* and a circuit board 42*c* on which the electrical components are mounted. The cycle begins as shown in FIG. 10*a*, with the circuit boards 42 being locked at their respective stations by indexing finger 403's pointed end 404, 405 engaging notch 42b under the biasing of spring 407. At this position, piston rod 334 is in the up position and thus shaft 339 lies in a position clockwise from that shown in FIG. 9 so that indexing finger 403 is free to move forward under the influence of spring 407. Also protruberance 413 rests in notch 410 and microswitch 414** is in its first positon indicating that the board is present and locked.

Upon completion of the station operation, piston rod 334 is lowered, raising transport arm 326 and rotating lock return shaft 339 counterclockwise. The rotation of shaft 339 brings cam 421 into engagement with surface 422 of index finger 403 which retracts it, against the action of spring 407, to the position shown in FIGS. 9 and **10*b*. The indexing finger unlocks the board 42 and protuberances 413 disengages notch 410 placing microswitch 414 in its second position indicating the unlocking of board 42. After the board 42 has been transported to its next station, piston rod 334 is raised, lowering transport arm 326 and rotating shaft 339 clockwise, which disengages cam 421 and surface 422 allowing the index finger 403 to engage slot 42*b* under the biasing of spring 407 as shown in FIG. 10*a*.**

If board 42 is not properly positioned at a station, for example not being transported far enough, indexing finger 403 will extend past its normal position and protuberance 413 would extend past its normally engaged lateral edge of indexing finger 403. The microswitch 414 would assume its third position indicating the board was not present and the master control module 30 would indicate a failure and initiate an appropriate action. If during the locking period of the operation cycle pointed end 404, 405 of indexing finger 403 should engage the lateral edge of board 42*a* and not rest in notch 42*b*, microswitch 414 would be in its second position. The master control module would also indicate a failure for this situation. Thus a failure would be indicated if the microswitch assumes a condition other than the desired condition during any part of the operation cycle.

The present process line provides a module concept wherein component processing and transport modules may be added without modification to the existing process line, since the units need only be interconnected at the transport rails and the transport arm drive shaft by a simple bolting operation.

Although the invention has been described and illustrated in detail, it is clearly understood that the spirit and scope of this invention is to be limited only by the terms of the appended claims.

What is claimed:

1. An automatic system for mounting electrical components to circuit boards, said board having a leading, a trailing and two lateral edges comprising:

a pair of continuous rails adapted to support said circuit board at said lateral edges;

a transport arm adapted to engage said trailing edge of said circuit board;

a transport arm lateral drive means, upon which said transport arm is mounted for causing linear reciprocating movement of the transport arm;

a board locking means for engaging one of said lateral edges of circuit boards; and a control means connected to said transport arm lateral drive means and said board locking means for causing said transport arm to advance during disengagement of said board locking means and said lateral edges.

2. The system of claim 1 including a transport arm rotary drive means for rotating said transport arm out of a horizontal plane defined by said circuit board, said control means connected to said transport arm rotary drive means for causing said transport arm to rotate out of said horizontal plane following said transport arm advancement and to rotate and stop in said horizontal plane before said advancement.

3. The system of claim 2 wherein said board locking means comprises an index finger having a tapered end, said circuit board having an indentation adapted to receive said tapered end.

4. A system as in claim 3 including a sensor means engaging said index finger for sensing whether said index tapered end engages said indentation, engages a lateral edge of said circuit board, or does not engage said circuit board at all.

5. A system as in claim 3 wherein said board locking means includes a biasing means for causing said index finger to engage said circuit board, and an unlocking means for causing said index finger to disengage said circuit board.

6. A system as in claim 5 wherein said transport arm lateral drive means comprises a transport shaft on which said transport arm is mounted, said unlocking means comprises an unlocking shaft and a cam mounted on said unlocking shaft adapted to engage said index finger, and said control means causes said shafts to rotate simultaneously.

7. A system as in claim 6 wherein said transport shaft includes a key mounted thereon, said transport arm rotary drive means includes an arm having a C-shaped aperture surrounding said transport shaft and said key.

8. An automatic system for mounting electrical components to a circuit board, said circuit board having a leading, a trailing and two lateral edges, comprising:

a pair of continuous rails adapted to support said circuit board;

a plurality of mounting stations laterally spaced along said rails;

a plurality of transport arms, one for each station, adapted to engage said trailing edge of said circuit board;

a transport arm lateral drive means to which said transport arms are mounted for producing intermittent lateral movement of said transport arms;

a transport arm rotary drive means connected to said transport arms, for rotating said transport arms into and out of a horizontal plane defined by said circuit boards; and control means connected to said transport arm lateral and rotary drive means for causing said transport arm to engage said circuit board, to laterally advance said circuit board from station to station, and to disengage said circuit board.

9. A system as in claim 8 wherein said circuit boards have an indentation in one of said lateral edges, including a plurality of board locking means, one for each station, for engaging said indentation, and wherein said control means causes said locking means to engage said circuit boards during processing at said stations and to disengage during circuit board advancement between stations.

10. A system for mounting components to a board comprising:

a pair of continuous rails adapted to support said board;

a plurality of mounting stations laterally spaced along said rails;

a plurality of transport arms, one for each station adapted to engage said boards, a transport arm drive means to which said transport arms are mounted for causing said transport arm to engage said board to advance said board to the next station, to rotate out of a horizontal plane defined by said board, to return to its first station and to rotate back into said horizontal plane, and a plurality of locking means, one for each station, for engaging a lateral edge of the board during processing at said station.

11. A system as in claim 10 wherein said board has an indentation in said lateral edge and said locking means includes a finger adapted to engage said indentation during processing at said stations.

12. A system as in claim 11 wherein said transport arm drive means includes a transport arm drive shaft to which said transport arms are mounted, said locking means includes a finger drive shaft with a cam mounted thereon adapted to engage said locking fingers, and a synchronization means connected to said transportation and finger drive shafts to cause said transport arms to rotate and said locking fingers to engage or disengage said boards simultaneously.

13. A system for mounting electrical components to circuit boards comprising;

a pair of continuous rails adapted to support said circuit boards;

a plurality of mounting stations laterally spaced along said rails;

a transport drive shaft traversing the length of said rails;

a plurality of transport arms, one for each station, mounted to said transport drive shaft;

a lateral drive means connected to said transport drive shaft for moving said transport arms from a first station to a second station and back to said first station; and rotary drive means connected to said transport drive shaft for rotating said transport arms into and out of a horizontal plane defined by said circuit boards.

14. A system as in claim 13 wherein said circuit boards have a leading, a trailing, and two lateral edges, and including a plurality of locking means, one for each station, for engaging a lateral edge of said circuit board during processing at said station.

15. A system as in claim 14 wherein said locking means comprises a finger for engaging said lateral edge, a lock drive shaft with a plurality of cams, one for each finger, mounted thereon adapted to engage said finger, linkage interconnecting said lock drive shaft and said transport drive shaft whereby said transport drive shaft and said lock shaft rotate simultaneously.

* * * * *

PO-1050
(5/69)

UNITED STATES PATENT OFFICE
CERTIFICATE OF CORRECTION

Patent No. 3,808,662 Dated May 7, 1974

Inventor(s) PHILLIP A. RAGARD

It is certified that error appears in the above-identified patent and that said Letters Patent are hereby corrected as shown below:

At page 1 (cover sheet), item 73, the address of the assignee, quote "Binghamton, England", should read --Binghamton, New York--

Page 1 (cover sheet), item 56, references cited, the following United States Patents should be included:

| | | | |
|---|---|---|---|
| 2,893,008 | 7-1959 | Gagnon | 227-1 |
| 2,893,009 | 7-1959 | Bergsland et al | 227-1 |
| 2,908,010 | 10-1959 | Lord et al | 29203.B |
| 3,722,062 | 3-1973 | Gharaibeh | 29203.B |

Signed and sealed this 8th day of October 1974.

(SEAL)
Attest:

McCOY M. GIBSON JR.
Attesting Officer

C. MARSHALL DANN
Commissioner of Patents